United States Patent
Garcia Navarro

(10) Patent No.: US 11,044,516 B2
(45) Date of Patent: *Jun. 22, 2021

(54) APPARATUS, SYSTEMS AND METHODS FOR MEDIA MOSAIC MANAGEMENT

(71) Applicant: Dish Technologies L.L.C., Englewood, CO (US)

(72) Inventor: Carlos Garcia Navarro, Boulder, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,840

(22) Filed: May 13, 2019

(65) Prior Publication Data

US 2019/0268651 A1  Aug. 29, 2019

Related U.S. Application Data

(60) Continuation of application No. 15/633,524, filed on Jun. 26, 2017, now Pat. No. 10,291,953, which is a division of application No. 14/956,995, filed on Dec. 2, 2015, now Pat. No. 9,699,514.

(51) Int. Cl.
| | | |
|---|---|---|
| H04N 21/432 | (2011.01) | |
| H04N 21/482 | (2011.01) | |
| H04N 21/431 | (2011.01) | |
| H04N 21/232 | (2011.01) | |
| H04N 21/231 | (2011.01) | |
| H04N 21/278 | (2011.01) | |
| H04N 21/433 | (2011.01) | |
| H04N 21/454 | (2011.01) | |
| H04N 21/466 | (2011.01) | |
| H04N 21/485 | (2011.01) | |
| H04N 21/2187 | (2011.01) | |

(52) U.S. Cl.
CPC ..... *H04N 21/4325* (2013.01); *H04N 21/2187* (2013.01); *H04N 21/232* (2013.01); *H04N 21/23109* (2013.01); *H04N 21/278* (2013.01); *H04N 21/431* (2013.01); *H04N 21/4316* (2013.01); *H04N 21/4332* (2013.01); *H04N 21/454* (2013.01); *H04N 21/466* (2013.01); *H04N 21/482* (2013.01); *H04N 21/485* (2013.01); *H04N 21/4821* (2013.01)

(58) Field of Classification Search
None
See application file for complete search history.

(56) References Cited

U.S. PATENT DOCUMENTS

| | | | | |
|---|---|---|---|---|
| 6,978,310 | B1 * | 12/2005 | Rodriguez | H04N 21/4312 348/14.07 |
| 7,581,237 | B1 | 8/2009 | Kurapati | |
| 8,056,099 | B2 | 11/2011 | Shanks et al. | |
| 8,132,208 | B2 | 3/2012 | Gonzalez | |
| 8,413,187 | B1 * | 4/2013 | Del Sesto | H04N 21/2355 725/39 |

(Continued)

*Primary Examiner* — Ricky Chin
(74) *Attorney, Agent, or Firm* — Perkins Cole LLP

(57) ABSTRACT

Systems and methods for managing media mosaics are described. One embodiment provides a media mosaic management method in a media device. The method generates a mosaic filter based on a program selected from a first media mosaic. The mosaic filter is used to identify related programs for presentation in a second, customized media mosaic.

18 Claims, 17 Drawing Sheets

| Event #1 | | Event #2 | |
|---|---|---|---|
| Type | Movie | Type | Movie |
| Title | Jurassic Park | Title | Independence Day |
| Key words | Dinosaur | Key words | Alien |
| Genre 1 | Adventure | Genre 1 | Action |
| Genre 2 | Sci-fi | Genre 2 | Adventure |
| Director | Spielberg | Director | Emmerich |
| Writer | M Crichton | Writer | Emmerich |
| TV host | N/A | TV host | N/A |
| Actor 1 | Sam Neill | Actor 1 | Will Smith |
| Actor 2 | Laura Dern | Actor 2 | Jeff Goldblum |
| Actor 3 | Jeff Goldblum | Actor 3 | Bill Pullman |
| Year of premiere | 1990-1995 | Year of premiere | 1996-2000 |
| Metadata | John | Metadata | |

(56) References Cited

U.S. PATENT DOCUMENTS

| | | |
|---|---|---|
| 8,701,141 B2 | 4/2014 | Yates |
| 9,532,111 B1 | 12/2016 | Christie et al. |
| 9,699,514 B2* | 7/2017 | Garcia Navarro ... H04N 21/482 |
| 10,291,953 B2* | 5/2019 | Garcia Navarro ... H04N 21/482 |
| 2002/0067376 A1* | 6/2002 | Martin .................. G06Q 30/02 |
| | | 715/810 |
| 2002/0116705 A1 | 8/2002 | Perlman et al. |
| 2003/0050058 A1 | 3/2003 | Walsh et al. |
| 2003/0123853 A1 | 7/2003 | Iwahara et al. |
| 2004/0268413 A1* | 12/2004 | Reid ..................... G06Q 30/02 |
| | | 725/131 |
| 2005/0144295 A1 | 6/2005 | Tsunoda et al. |
| 2006/0020962 A1* | 1/2006 | Stark ................ H04N 21/4227 |
| | | 725/32 |
| 2007/0011702 A1* | 1/2007 | Vaysman ............... H04N 21/84 |
| | | 725/45 |
| 2007/0192739 A1* | 8/2007 | Hunleth ................ G06F 3/0481 |
| | | 715/823 |
| 2007/0234388 A1 | 10/2007 | King |
| 2008/0155615 A1* | 6/2008 | Craner ............... H04N 21/4751 |
| | | 725/91 |
| 2008/0162406 A1 | 7/2008 | St. John-Larkin |
| 2008/0301732 A1 | 12/2008 | Archer et al. |
| 2009/0060469 A1 | 3/2009 | Olague et al. |
| 2009/0158337 A1 | 6/2009 | Stiers et al. |
| 2009/0228943 A1 | 9/2009 | Ramaswamy et al. |
| 2010/0153999 A1* | 6/2010 | Yates .................. H04N 5/44543 |
| | | 725/39 |
| 2010/0171881 A1 | 7/2010 | Castellan et al. |
| 2010/0235351 A1 | 9/2010 | Iwasa et al. |
| 2011/0113449 A1* | 5/2011 | Raine .................. H04N 21/4722 |
| | | 725/52 |
| 2011/0247036 A1 | 10/2011 | Adimatyam et al. |
| 2012/0072952 A1 | 3/2012 | Vaysman et al. |
| 2012/0151511 A1 | 6/2012 | Bernard et al. |
| 2012/0201519 A1 | 8/2012 | Reynolds et al. |
| 2013/0111526 A1* | 5/2013 | Glowaty ............. H04N 21/4826 |
| | | 725/53 |
| 2013/0139202 A1 | 5/2013 | Purpura et al. |
| 2013/0283318 A1 | 10/2013 | Wannamaker |
| 2014/0101706 A1 | 4/2014 | Kardatzke |
| 2014/0214980 A1* | 7/2014 | Jung ...................... H04L 51/12 |
| | | 709/206 |
| 2014/0229987 A1 | 8/2014 | Yates |
| 2014/0298386 A1 | 10/2014 | Dasgupta |
| 2015/0181132 A1 | 6/2015 | Kummer et al. |
| 2015/0181279 A1 | 6/2015 | Martch et al. |
| 2015/0312618 A1* | 10/2015 | McElhatten ...... H04N 21/25891 |
| | | 725/53 |
| 2015/0382061 A1 | 12/2015 | Maisenbacher et al. |
| 2016/0142760 A1* | 5/2016 | Son .................. H04N 21/47202 |
| | | 725/49 |
| 2016/0191999 A1 | 6/2016 | Friedrich |
| 2016/0234555 A1* | 8/2016 | Kaya .................. H04N 21/4756 |

* cited by examiner

FIG. 2D

| Event #1 | |
|---|---|
| Type | Movie |
| Title | Jurassic Park |
| Key words | Dinosaur |
| Genre 1 | Adventure |
| Genre 2 | Sci-fi |
| Director | Spielberg |
| Writer | M Crichton |
| TV host | N/A |
| Actor 1 | Sam Neill |
| Actor 2 | Laura Dern |
| Actor 3 | Jeff Goldblum |
| Year of premiere | 1991-1995 |
| Metadata 1 | John |

FIG. 3A

Event Type points table — 310

|  | Movie | Documentary | Series | Sports | News | Talk show | Music videoclips |
|---|---|---|---|---|---|---|---|
| Movie | 20 | 10 | 5 | 0 | 0 | 0 | 0 |
| Documentary | 10 | 20 | 5 | 0 | 0 | 0 | 0 |
| Series | 5 | 5 | 20 | 0 | 0 | 5 | 0 |
| Sports | 0 | 0 | 0 | 20 | 5 | 0 | 0 |
| News | 0 | 0 | 5 | 5 | 20 | 5 | 0 |
| Talk shows | 0 | 0 | 5 | 0 | 5 | 20 | 0 |
| Music videoclips | 0 | 0 | 0 | 0 | 0 | 0 | 20 |

FIG. 3B

Genre points table /320

| | Action | Adventure | Comedy | Crime | Fantasy | Thriller | Romance | Sci-fi | Mystery |
|---|---|---|---|---|---|---|---|---|---|
| Action | 20 | 10 | 0 | 5 | 5 | 5 | 0 | 5 | 5 |
| Adventure | 10 | 20 | 0 | 5 | 5 | 10 | 0 | 10 | 5 |
| Comedy | 0 | 0 | 20 | 0 | 0 | 0 | 5 | 0 | 0 |
| Crime | 5 | 5 | 0 | 20 | 0 | 10 | 0 | 5 | 5 |
| Fantasy | 5 | 5 | 0 | 0 | 20 | 2 | 0 | 3 | 5 |
| Thriller | 5 | 10 | 5 | 10 | 2 | 20 | 0 | 5 | 10 |
| Romance | 0 | 0 | 0 | 0 | 0 | 0 | 20 | 0 | 10 |
| Sci-fi | 5 | 10 | 0 | 5 | 3 | 5 | 0 | 20 | 10 |
| Mystery | 5 | 5 | 0 | 5 | 5 | 10 | 10 | 10 | 20 |

FIG. 3C

| Event #1 | |
|---|---|
| Type | Movie |
| Title | Jurassic Park |
| Key words | Dinosaur |
| Genre 1 | Adventure |
| Genre 2 | Sci-fi |
| Director | Spielberg |
| Writer | M Crichton |
| TV host | N/A |
| Actor 1 | Sam Neill |
| Actor 2 | Laura Dern |
| Actor 3 | Jeff Goldblum |
| Year of premiere | 1990-1995 |
| Metadata | John |

| Event #2 | |
|---|---|
| Type | Movie |
| Title | Independence Day |
| Key words | Alien |
| Genre 1 | Action |
| Genre 2 | Adventure |
| Director | Emmerich |
| Writer | Emmerich |
| TV host | N/A |
| Actor 1 | Will Smith |
| Actor 2 | Jeff Goldblum |
| Actor 3 | Bill Pullman |
| Year of premiere | 1996-2000 |
| Metadata | |

FIG. 3D

|  | Independence Day | |  |
|---|---|---|---|
|  | Genre 1- Action | Genre 2- Adventure | TOTAL |
| Genre 1- Adventure | 10 | 20 | 30 |
| Genre 2- Sci-fi | 5 | 10 | 15 |
| Jurassic Park | | TOTAL | 45 |

| Directors | Spielberg | Scorsese | Nolan | Bay | Tarantino | Allen | Welles | Raimi |
|---|---|---|---|---|---|---|---|---|
| Spielberg | 20 | 10 | 5 | 5 | 3 | 0 | 0 | 5 |
| Scorsese | 10 | 20 | 10 | 10 | 5 | 2 | 0 | 1 |
| Nolan | 5 | 10 | 20 | 10 | 5 | 0 | 0 | 5 |
| Bay | 5 | 10 | 10 | 20 | 2 | 2 | 0 | 1 |
| Tarantino | 3 | 5 | 5 | 2 | 20 | 5 | 5 | 3 |
| Allen | 0 | 2 | 0 | 2 | 5 | 20 | 5 | 3 |
| Welles | 0 | 0 | 0 | 0 | 5 | 5 | 20 | 10 |
| Raimi | 5 | 1 | 5 | 1 | 3 | 3 | 10 | 20 |

FIG. 3F

| Year of Premiere | 1985-1990 | 1991-1995 | 1996-2000 | 2001-2005 | 2006-2010 |
|---|---|---|---|---|---|
| 1985-1990 | 20 | 10 | 5 | 3 | 2 |
| 1991-1995 | 10 | 20 | 10 | 5 | 3 |
| 1996-2000 | 5 | 10 | 20 | 10 | 5 |
| 2001-2005 | 3 | 5 | 10 | 20 | 10 |
| 2006-2010 | 2 | 3 | 5 | 10 | 20 |

FIG. 3G

| "John" list | |
|---|---|
| Jurassic Park | 1,000,000 |
| Jurassic Park 2 | 100 |
| Jurassic Park 3 | 95 |
| Jurassic World | 80 |
| Jurassic City | 70 |
| Walking with dinosaurs | 45 |
| Jaws | 40 |
| Independence Day | 37 |

FIG. 3H

APPARATUS, SYSTEMS AND METHODS FOR MEDIA MOSAIC MANAGEMENT

PRIORITY CLAIM

This patent application is a Continuation of U.S. Non-Provisional patent application Ser. No. 15/633,524, filed Jun. 26, 2017, entitled "APPARATUS, SYSTEMS AND METHODS FOR MEDIA MOSAIC MANAGEMENT," issued as U.S. Pat. No. 10,291,953 on May 14, 2019, which is a Divisional of U.S. Non-Provisional patent application Ser. No. 14/956,995, filed Dec. 2, 2015, entitled "APPARATUS, SYSTEMS AND METHODS FOR MEDIA MOSAIC MANAGEMENT," and issued as U.S. Pat. No. 9,699,514 on Jul. 4, 2017, both of which are incorporated herein by reference in their entirety.

BACKGROUND

Media devices, such as set-top boxes, are configured to receive media content events (referred to herein interchangeably as a "program") from a broadcasting system. Non-limiting examples of media content events include movies, news programs, sporting events, serial comedies or dramas, and other thematic-based media content events. Media content events may also include advertisements, commercials or the like. Media content events may include one or more of video, audio, still images, text, and the like.

The media content events may be communicated to the media device by a program service provider over the broadcasting system. Non-limiting examples of broadcasting systems include satellite systems, cable or other wire-based systems, or over the air (OTA) broadcasting systems. Media content events may also be accessed from other sources, such as a web site or an on-demand content source via the Internet or other suitable communication system.

A legacy electronic program guide (EPG) may be used to present program viewing selection choices to a user. The legacy EPG has the look and feel of a table that uses a combination of text and/or symbols to indicate the program viewing choices that may be selected by the user. The legacy EPG is a type of a user interface that presents a menu, or a series of menus, that describe available programs that are available for presentation.

Typically, the legacy EPG is arranged as a table or grid. Each row of the table corresponds to a particular program provider (e.g., channel, station). The columns of the table correspond to particular time blocks. Each inner cell of the table identifies a particular program that is being broadcast during the corresponding time block.

Legacy EPGs are inherently limited in the amount of information that can be presented at a single moment by the size (dimensions) of the display that is presenting the legacy EPG to a user. In particular, the number of channels and time blocks is limited by the height and width of the display, respectively. Also, channels are arranged in a largely arbitrary manner, such that channels that are of interest to a particular user are not necessarily presented near one another, possibly requiring a considerable amount of scrolling to move between channels of interest.

A video mosaic is another type of user interface for presenting information about available programming. A video mosaic is typically a grid-based arrangement of tiles that each present information about an available program. Each tile presents information about a corresponding program, such as the program name, running time, video trailer, or the like.

Prior art video mosaics are limited in that they can only provide a relatively small amount of information. For example, a basic video mosaic may simply be a rearrangement of information that would be presented on a single page of a legacy EPG, such as a selection of programs coming from a sequence of channels (e.g., channels 1-12) and broadcasting at a particular time (e.g., 9:30 PM). In this way, the video mosaic is little better than the legacy EPG, and indeed may even be worse, because the video mosaic may not be able to present the even the same amount of information as the legacy EPG, because the tiles of the video mosaic may be larger than the corresponding cells of the EPG.

SUMMARY

Systems and methods for managing media mosaics are described. One embodiment provides a media mosaic management method in a media device. The method generates a mosaic filter based on a program selected from a first media mosaic. The filter is used to identify related programs for presentation in a customized second media mosaic.

In one embodiment, the method comprises outputting, for presentation on a display coupled to the media device, a first media mosaic that includes a first set of tiles that each correspond to a distinct media content event, wherein each of the multiple tiles displays video from the corresponding media content event; receiving an indication of a media content event corresponding to one of the multiple tiles selected by a user; determining multiple related media content events that are similar to the indicated media content event; and outputting, for presentation on the display, a second media mosaic that includes a second set of tiles that each correspond to a distinct one of the multiple related media content events.

Other embodiments provide devices, systems, and/or computer-readable media configured to perform methods for generating and outputting media mosaics.

BRIEF DESCRIPTION OF THE DRAWINGS

Preferred and alternative embodiments are described in detail below with reference to the following drawings:

FIGS. 2A-2F illustrate media mosaic management according to an example embodiment;

FIGS. 3A-3H are tables that illustrate an example filter scoring process provided by an example embodiment;

DETAILED DESCRIPTION

Figure 1:
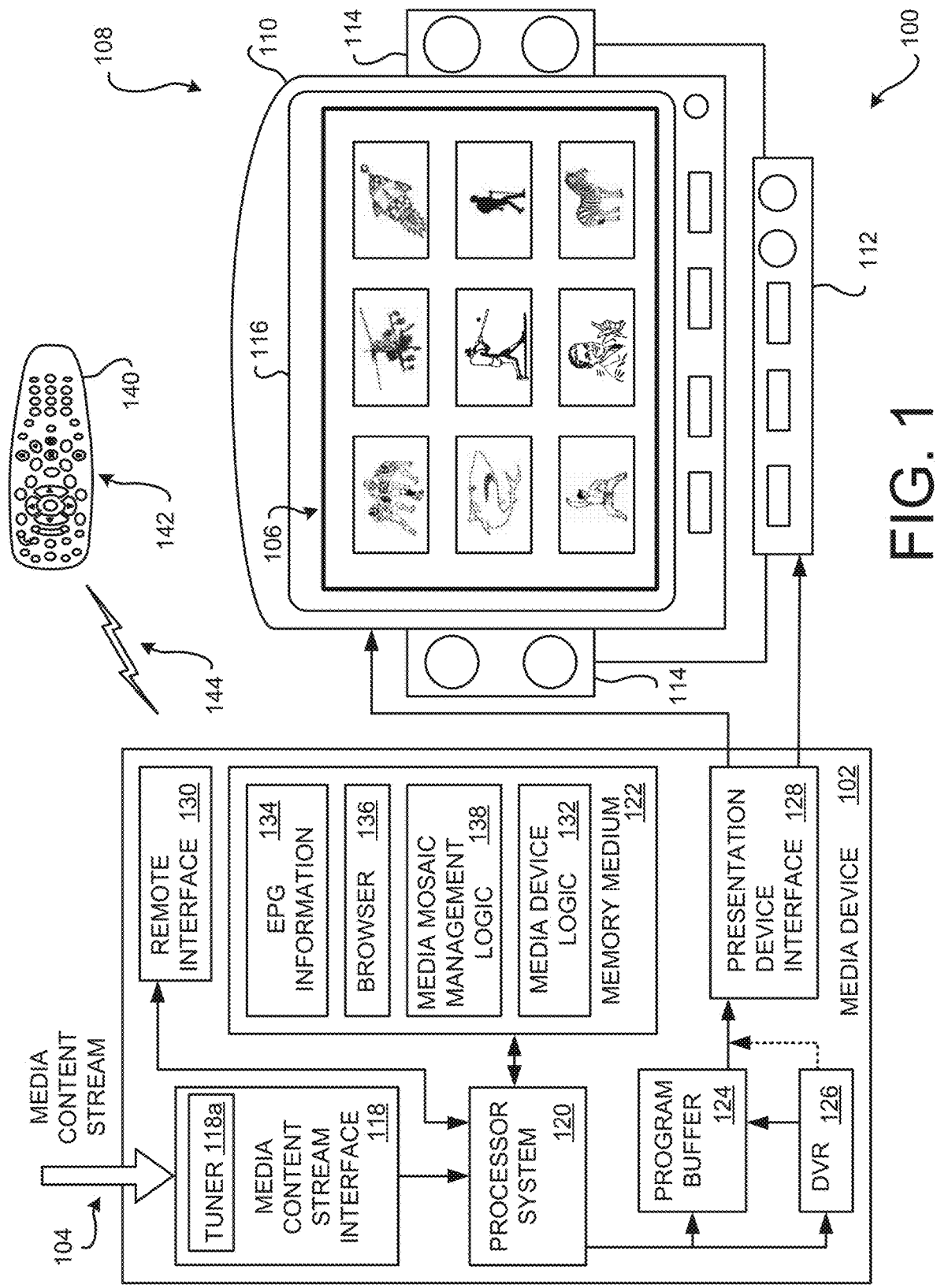
FIG. 1 is a block diagram of an embodiment of a media content event information system provisioned in a media device operating in an example environment.

FIG. 1 is a block diagram of an embodiment of a media content event information system 100 provisioned in a media device 102. The example media device 102 receives a plurality of programs in a media content stream 104.

Embodiments of the media content event information system 100 are configured to generate and output a media mosaic 106 that provides improvements over conventional legacy EPGs and/or video mosaics. As discussed further below, the media content event information system 100 generates a media mosaic that presents more relevant information about available programming than is possible on a legacy EPG or a video mosaic.

An example media device 102 includes, but is not limited to, a set-top box (STB) that is communicatively coupled to a broadcast system (not shown). In other embodiments, the media device 102 includes or is part of a television (TV), a digital video disc (DVD) player/recorder, a Blu-ray player/recorder, a game playing device, a mobile device (e.g., a tablet or smart phone), or a personal computer (PC). The media device 102 is configured to present selected media content events that are received in the media content stream 104.

The media content stream 104 may comprise one or more streaming media content events (referred to herein interchangeably as a "program") provided from the media content broadcast facility over the broadcast system (not shown) operated by a media content service provider. Non-limiting examples of broadcasting systems include satellite systems, cable or other wire-based systems, or over the air (OTA) broadcasting systems. Since the media content service provider is providing content from many individual program provider sources (referred to herein interchangeably as a "station"), or even thousands of different stations, some broadcasting systems provide a plurality of different media content streams 104 each providing content from one or more different stations.

The example media device 102 is communicatively coupled to a media presentation system 108 that includes a visual display device 110, such as a television (hereafter, generically a TV), and an audio presentation device 112, such as a surround sound receiver controlling an audio reproduction device (hereafter, generically, a speaker 114). Other types of output devices may also be coupled to the media device 102, including those providing any sort of stimuli sensible by a human being, such as temperature, vibration and the like. The video portion of the media content event is displayed on a display 116 and the audio portion of the media content event is reproduced as sounds by one or more speakers 114. In some embodiments, the media device 102 and one or more of the components of the media presentation system 108 may be integrated into a single electronic device. The video portion of the streamed media content is displayed on the display 116 and the audio portion of the streamed media content is reproduced as sounds by the speakers 114.

The example media device 102 comprises a media content stream interface 118, a processor system 120, a memory medium 122, a program buffer 124, an optional digital video recorder (DVR) 126, a presentation device interface 128, and a remote interface 130. The memory medium 122 comprises portions for storing the media device logic 132, electronic program guide (EPG) information 134, an optional browser 136, and media mosaic management logic 138 (the "mosaic manager"). In some embodiments, the media device logic 132 and the mosaic manager 138 may be integrated together, and/or may be integrated with other logic. In other embodiments, some or all of these memory and other data manipulation functions may be provided by and using remote server or other electronic devices suitably connected via the Internet or otherwise to a client device. Other media devices may include some, or may omit some, of the above-described media processing components. Further, additional components not described herein may be included in alternative embodiments.

The functionality of the media device 102, here a set-top box, is now broadly described. A media content service provider provides media content that is received in one or more multiple media content streams 104 multiplexed together in one or more transport channels. The transport channels with the media content streams 104 are communicated to the media device 102 from a media system sourced from a remote head end facility (not shown) operated by the media content service provider. Non-limiting examples of such media systems include satellite systems, cable system, and the Internet. For example, if the media content provider provides programming via a satellite-based communication system, the media device 102 is configured to receive one or more broadcasted satellite signals detected by an antenna (not shown). Alternatively, or additionally, the media content stream 104 can be received from one or more different sources, such as, but not limited to, a cable system, a radio frequency (RF) communication system, or the Internet.

The one or more media content streams 104 are received by the media content stream interface 118. In a broadcast environment, one or more tuners 118*a* in the media content stream interface 118 selectively tune to one of the media content streams 104 in accordance with instructions received from the processor system 120. The processor system 120, executing the media device logic 132 and based upon a request for a particular program of interest specified by a user, parses out (e.g., demultiplexes) media content associated with the specified program. The program is then assembled into a stream of video and/or audio information which may be stored by the program buffer 124 such that the media content of the program can be streamed out to components of the media presentation system 108, such as the visual display device 110 and/or the audio presentation device 112, via the presentation device interface 128. Alternatively, or additionally, the parsed out media content may be saved into the DVR 126 for later presentation. The DVR 126 may be directly provided in, locally connected to, or remotely connected to, the media device 102. In alternative embodiments, the media content streams 104 may be stored for later decompression, processing and/or decryption.

From time to time, information populating the EPG information 134 portion of the memory medium 122 is communicated to the media device 102, via the media content stream 104 or via another suitable content distribution system. The EPG information 134 stores information pertaining to the scheduled programming of a plurality of different programs that are available from the plurality of different stations. The information stored in the EPG information 134 portion of the memory medium 122 may include, but is not limited to, a scheduled presentation start and/or end time for each program (or a start time and a duration of the program), a channel number and/or station call letters, and descriptive information about each program, station, and/or channel.

The program's descriptive information (program identification information or the like) may include the title of the program, names of persons or entities associated with the program (e.g., producers, directors, performers, actors, and/or teams), date of creation, and a summary describing the nature of the media content event. Any suitable information may be included in the program's descriptive information, including thumbnail images and/or short duration thumbnail video clips. As discussed further below, the EPG information 134 is used to generate the media mosaic 106 that is presented upon the display 116.

The EPG information 134 may include thumbnail images and/or a thumbnail video clip associated with programs. A thumbnail image is a small sized still image that imparts information pertaining to a particular program. A thumbnail video clip is a short duration video that imparts information pertaining to a particular program. The thumbnail image and/or thumbnail image clip may be presented as part of the media mosaic 106.

The example media device 102 is configured to receive commands from a user via a remote control 140. The remote control 140 includes one or more controllers 142 disposed on the surface of the remote control 140. The user, by actuating one or more of the controllers 142, causes the remote control 140 to generate and transmit commands, via a wireless signal 144, to the media device 102. The commands control the media device 102 and/or control the components of the media presentation system 108. The wireless signal 144 may be an infrared (IR) signal or a radio frequency (RF) signal that is detectable by the remote interface 130.

The processes performed by the media device 102 relating to the processing of the received media content stream 104 and communication of a presentable media content event to the components of the media presentation system 106 are generally implemented by the processor system 120 while executing the media device logic 132. Thus, the media device 102 may perform a variety of functions related to the processing and presentation of one or more programs (media content events) received in the media content stream 104.

FIGS. 2A-2F illustrate media mosaic management according to an example embodiment. The functions and operations described with respect to the following figures may be performed by the media mosaic manager 138. By way of overview, the media mosaic manager 138 presents a media mosaic that displays information about available programming via multiple tiles that each display information about a corresponding program. The tiles shown in a given mosaic may be selected based on various factors, including user preferences, user viewing habits, a mosaic filter, time of day, or the like.

Figure 2A:
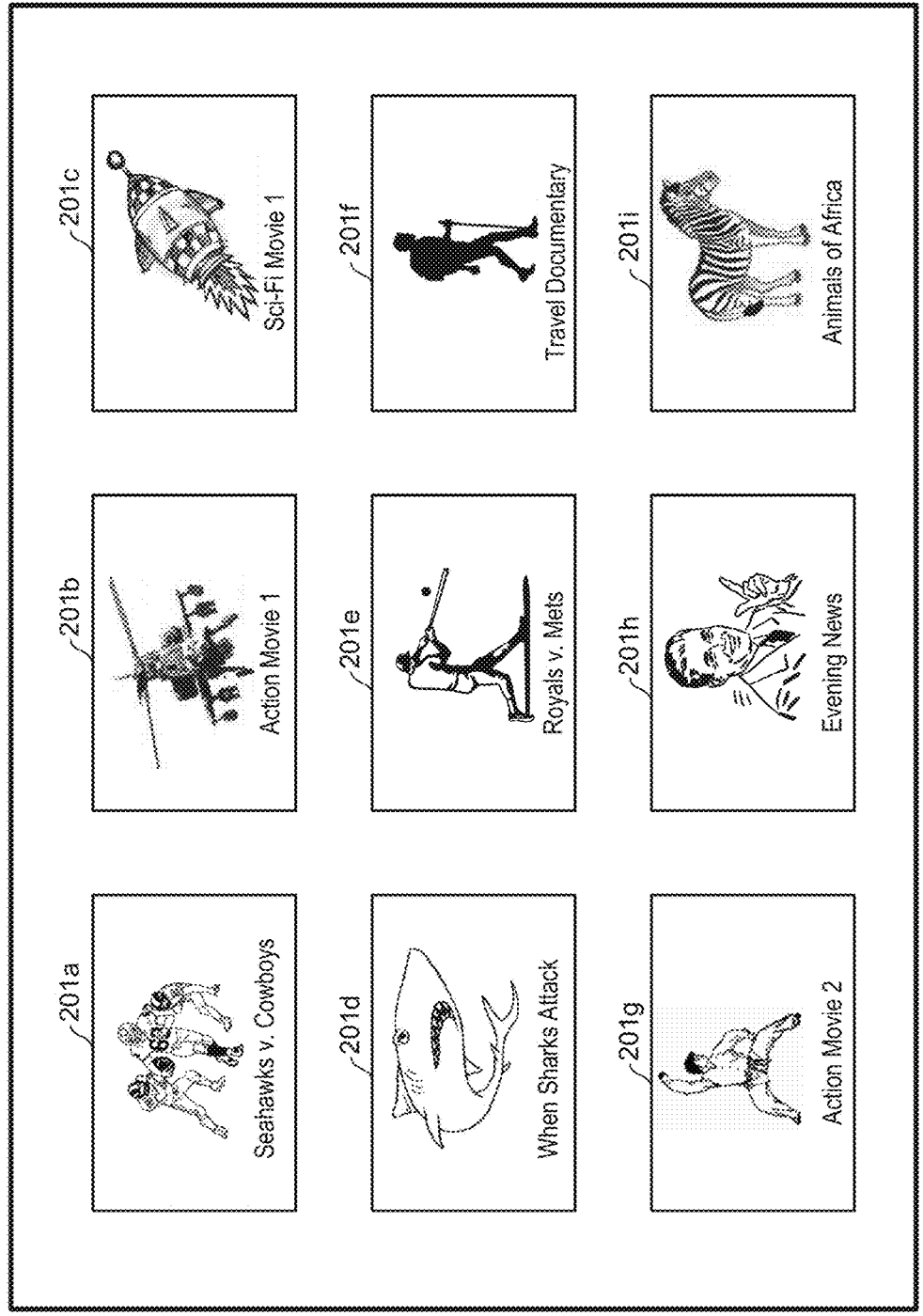

FIG. 2A provides an enlarged view of the media mosaic 106 introduced with respect to FIG. 1, above. The media mosaic 106 includes multiple tiles 201a-201i. Each tile presents information about a corresponding program that is available for viewing via the media device 102, including programs that are currently being broadcast, scheduled for future broadcast, available on-demand, previously stored (e.g., in a DVR), or the like.

In some embodiments and configurations, all of the tiles of the media mosaic 106 present information about programs that are currently available, such as programs that are being broadcast at the time when the media mosaic 106 is being viewed. The media mosaic 106 may provide different views, which may be selected by the user. For example, a first view may show currently broadcast programs, a second view may show stored programs, a third view may show on-demand programs, a fourth view may show programs scheduled for broadcast at a selected time, and the like.

Each of the tiles of the media mosaic 106 presents information about a corresponding program. The information may include text (e.g., the program name) and video or still images from the program. For example, tile 201a shows the title of a sporting event, Seahawks versus Cowboys, along with video from the sporting event. The video may be live (e.g., the actual video being broadcast concurrently with the viewing of the media mosaic 106) or a clip that was previously captured and stored. Similarly, tile 201b shows the title of a movie ("Action Movie 1") along with video from the movie. Again, the video may be live or previously stored. Tiles 202c-201i similarly each provide the name and video from a corresponding program.

The user can scroll through the different videos in the mosaic, which may activate the audio for the corresponding video. When the user decides that they want to watch program, then they can select the video (e.g., by pressing "select" on the remote control), and the media device will display only that channel. Other actions include setting a timer, recording the content or seeing additional information. For future events, video and/or audio may not be available, for example in the case of a movie premiere or a football game that has not started yet. However, the mosaic manager 138 is able to access trailers or other video and audio clips to be presented to the user. These video/audio clips can be stored internally in a hard drive (or similar) in the media device, or in a remote database or storage from where the media device can retrieve them.

The mosaic manager 138 may decide whether or not to show live programming via the mosaic 106. For example, the mosaic manager 138 may determine whether showing live video will likely spoil the ending or viewing of a particular event. For example, showing video from the last half hour of a movie or any live video from a sporting event may spoil the viewer's enjoyment of the program. In such cases, the mosaic manager 138 may instead show a video clip from the beginning of the program, a canned trailer, or other non-live content (e.g., a still image). This determination may be made based on user preference and/or default rules.

Figure 2B:
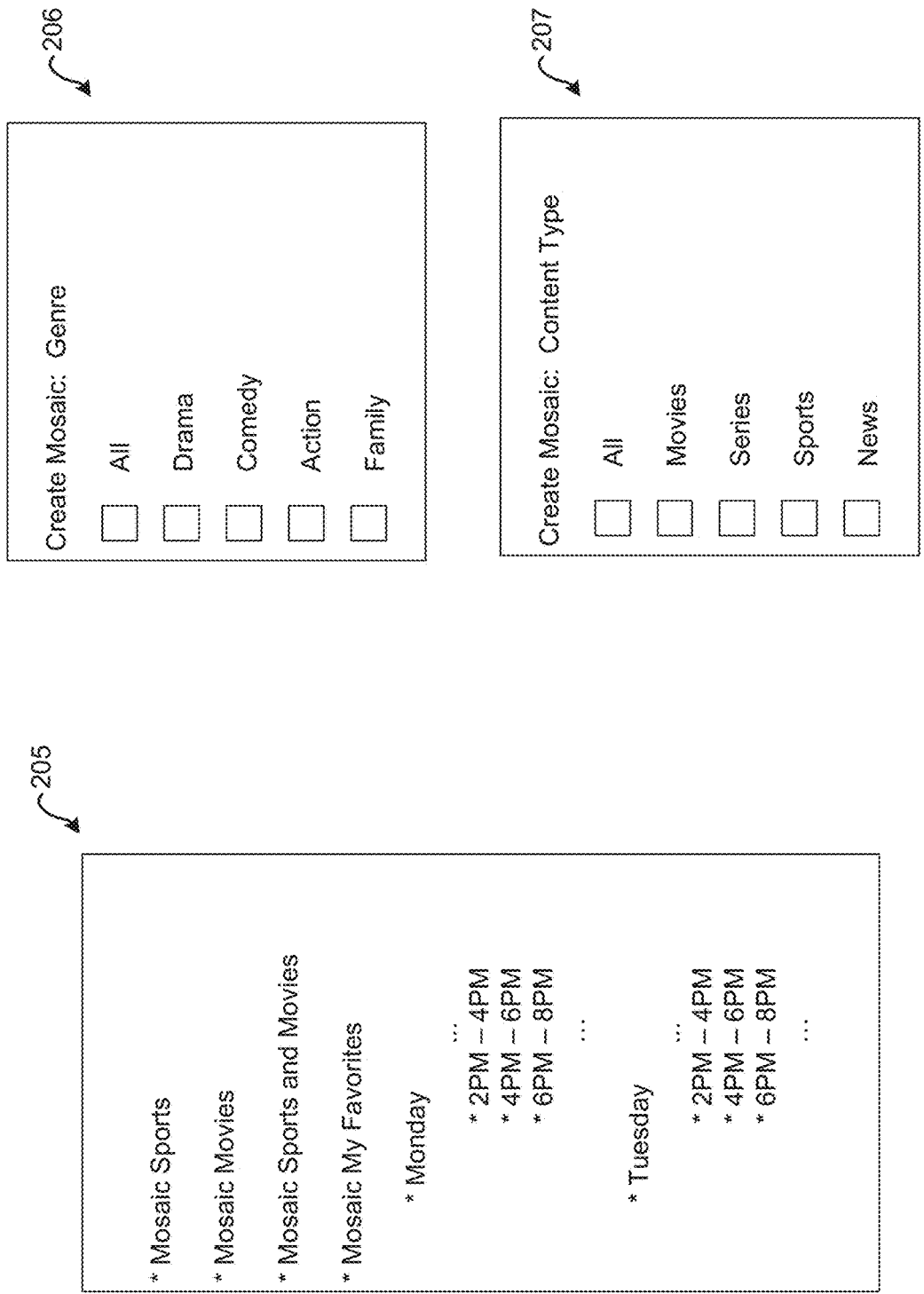

FIG. 2B illustrates user interface controls 205-207 for specifying personal preferences for the creation of a mosaic. A mosaic may include one or more programs that have been selected based on the personal preferences specified by the user. The mosaic can also be created based on viewing habits for the timeslot that the user requests the mosaic. For example, the user can create different mosaics based on filters, such as "only movies," "only sports," "only sport and movie events," or the like.

Control 205 is a screen, window, or dialog that can be accessed through a main menu (or other user interface) provided by the media device or through a button in the remote control. Control 205 shows a list of different mosaics as described above. The user can also access mosaics that include all of the programming events based on viewing habits for a specific timeslot, such as Monday 2 pm-4 pm, Monday 4 pm-6 pm, etc. In order to avoid the inconvenience of having to go through a large number of mosaics, some embodiments provide a way to quickly access a main, preferred, or frequently used mosaic, such as a "Mosaic Favorites" for the current time slot, a "Recently Used Mosaic," "Frequently Used Mosaic," or the like.

The mosaic manager 138 may consider which channels are the most popular according to the user viewing habits, or in other words, what are the channels that the subscriber normally watches at the time that the mosaic is requested. The user can change the duration of this timeslot to be more or less than 2 h. In the example of control 205, if the user requests the mosaic at 6:30 pm, the mosaic manager 138 will consider the most popular channels for the subscriber between 6 pm and 8 pm. The mosaic manager 138 may include channels that include recommended programming events based on the viewing habits of the user. The mosaic manager 138 may include free previews of pay-per-view and/or video-on-demand content, or from other sources. The mosaic may also include the most popular programming events based on the total amount of viewers that are currently watching television.

Controls 206 and 207 are screens that are configured to specify mosaic properties, in order to indicate certain preferences, such as the theme or genre of the events to be shown in a mosaic. For example, the user may interact with control 206 in order to specify that only programs of one or more selected genres are to be shown in the mosaic. As another example, the user may interact with control 207 in order to specify that only programs of one or more selected content types are to be shown in the mosaic.

The user can create several mosaics. In embodiments where the mosaic manager 138 creates customized mosaics with recommendations based on a user's viewing habits, or based on overall popularity, there may be only one mosaic, but the user can select how many videos will show up in the mosaic. Each video may include information about the event and the channel, and this information may be accessible through the remote control.

The mosaic manager 138 may also generate mosaics based on user preference inputs specified directly into the mosaic 106. For example, the user may be able to interactively modify the set of programs included in a mosaic, such as by selecting one of the displayed tiles and pushing a button (e.g., on the remote or on the tile itself) to indicate that the user likes/dislikes the program associated with the tile. This input becomes a new factor for the process that determines the personalized mosaic. Alternatively, the user may be able to move tiles around to adjust the order in which the clips are displayed in the mosaic, thereby indicating an order of relative preference for the corresponding programs. In some cases, such interactivity may be provided via a companion mobile device (e.g., the user's tablet or smart phone) that displays the mosaic, such that the user can use touch gestures to rearrange the tiles of mosaic.

FIGS. 2C-2F illustrate a mosaic filtering technique provided by some embodiments. The described filtering technique allows a user to select a first program (from a first mosaic) that functions as a filter. This filter is used to identify similar programs that are then shown via a second, filtered mosaic.

Figure 2C:
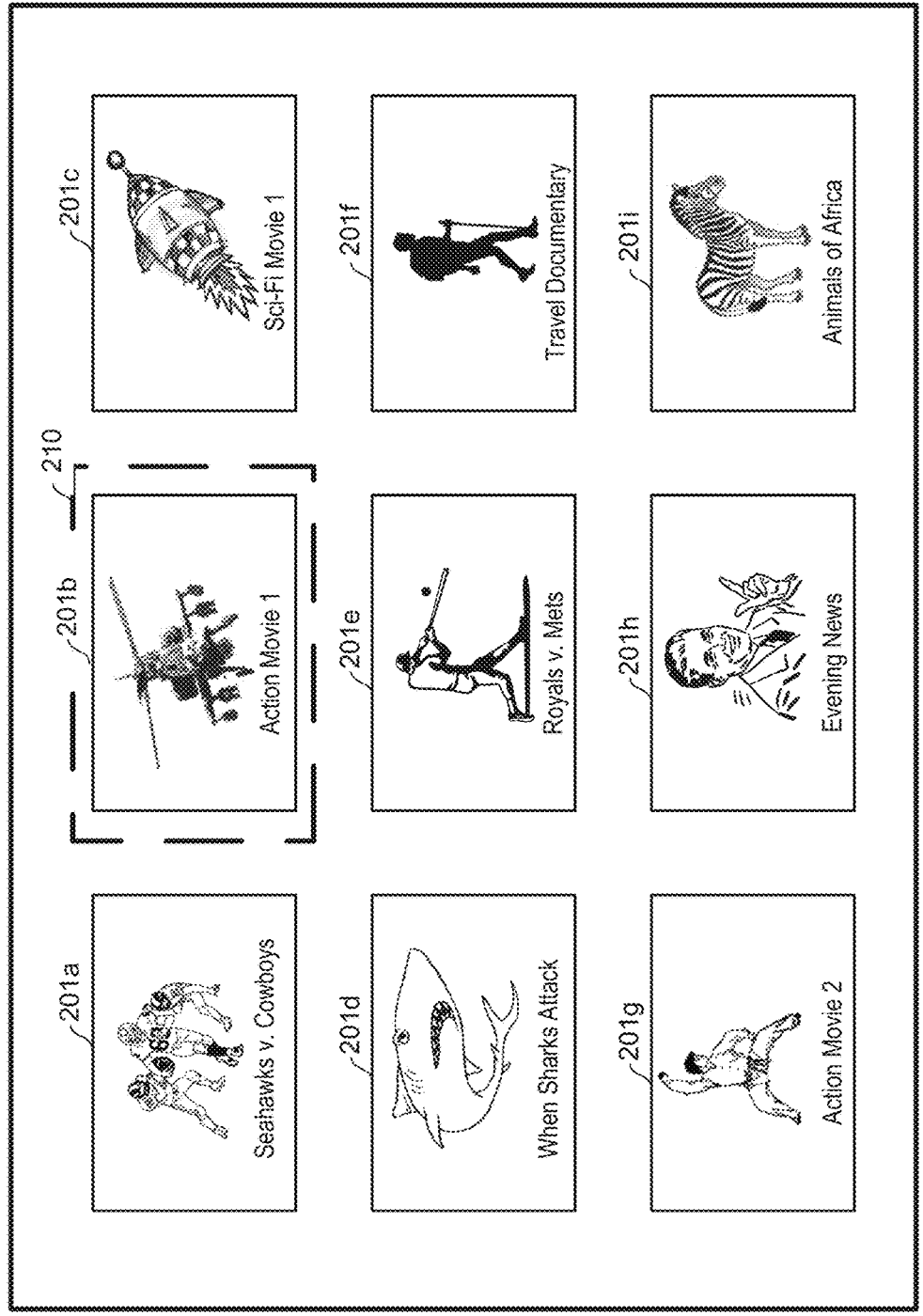

FIG. 2C illustrates the selection of a tile for purposes of creating an example mosaic filter. FIG. 2C shows the media mosaic 106 along with a selection control 210. The selection control 210 can be operated like a cursor or pointer via an input device, such as the remote control 140, mobile device (e.g., in communication with the media device), or the like. The user can move the selection control 210 from one tile to another. In this case, the user moves the selection control 210 to tile 201b, and then indicates a selection, such as by pressing a button (e.g., OK, ENTER), making a gesture (e.g., double click, tap), or the like.

Figure 2D:
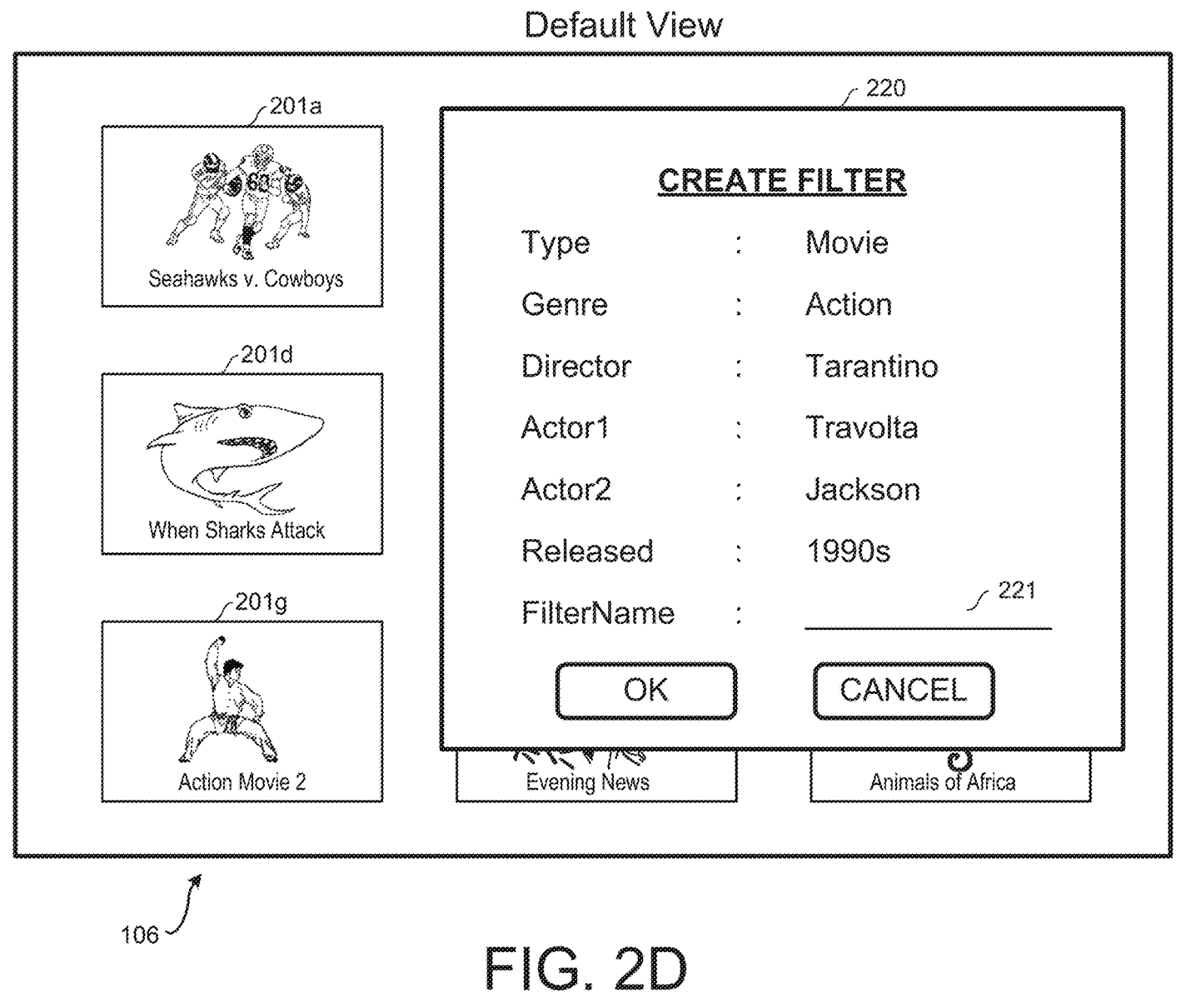

FIG. 2D illustrates a mosaic filter creation dialog 220 used to generate the example mosaic filter. Once the user selects a given tile, the media mosaic 106 presents the filter creation dialog 220. Continuing the example of FIG. 2C, the user has selected tile 201b, which is associated with an action movie. In response, the media mosaic 106 presents the filter creation dialog 220. The filter creation dialog 220 is populated with attributes of the selected action movie of tile 201b. The displayed attributes are obtained from metadata associated with the selected movie, such as may be stored with reference to EPG information or some other repository.

In the illustrated embodiment, the attributes are represented as name-value pairs, such as Type=Movie, Genre=Action, Director=Tarantino, and the like. The filter creation dialog 220 is in some embodiments configured to allow the user to edit some or all of the attributes to more specifically reflect the characteristics of the filter. In the illustrated embodiment, the filter creation dialog 220 includes a text entry field 221 that is operated by the user to enter a name for the filter. In this field, the user can enter their name (e.g., "John") or some other string or tag that will help the user remember the name and/or purpose of the filter (e.g., "MyActionMovies"). In some embodiments, the media mosaic 106 prepopulates the field 221 with default values based on information such as user identifier (e.g., user name, if known) and/or some combination of the displayed metadata (e.g., "Movie-Action").

Once the user reviews and possibly edits the displayed attributes to his satisfaction, the user can create the mosaic filter by selecting the OK button. As will be discussed in more detail below, the mosaic filter is then applied to stored program information in order to select one or more programs that have attributes that are similar to attributes associated with the mosaic filter. The media mosaic 106 then presents tiles corresponding to the selected programs, thereby presenting program information that is more relevant and tailored to the interests of the user.

Figure 2E:
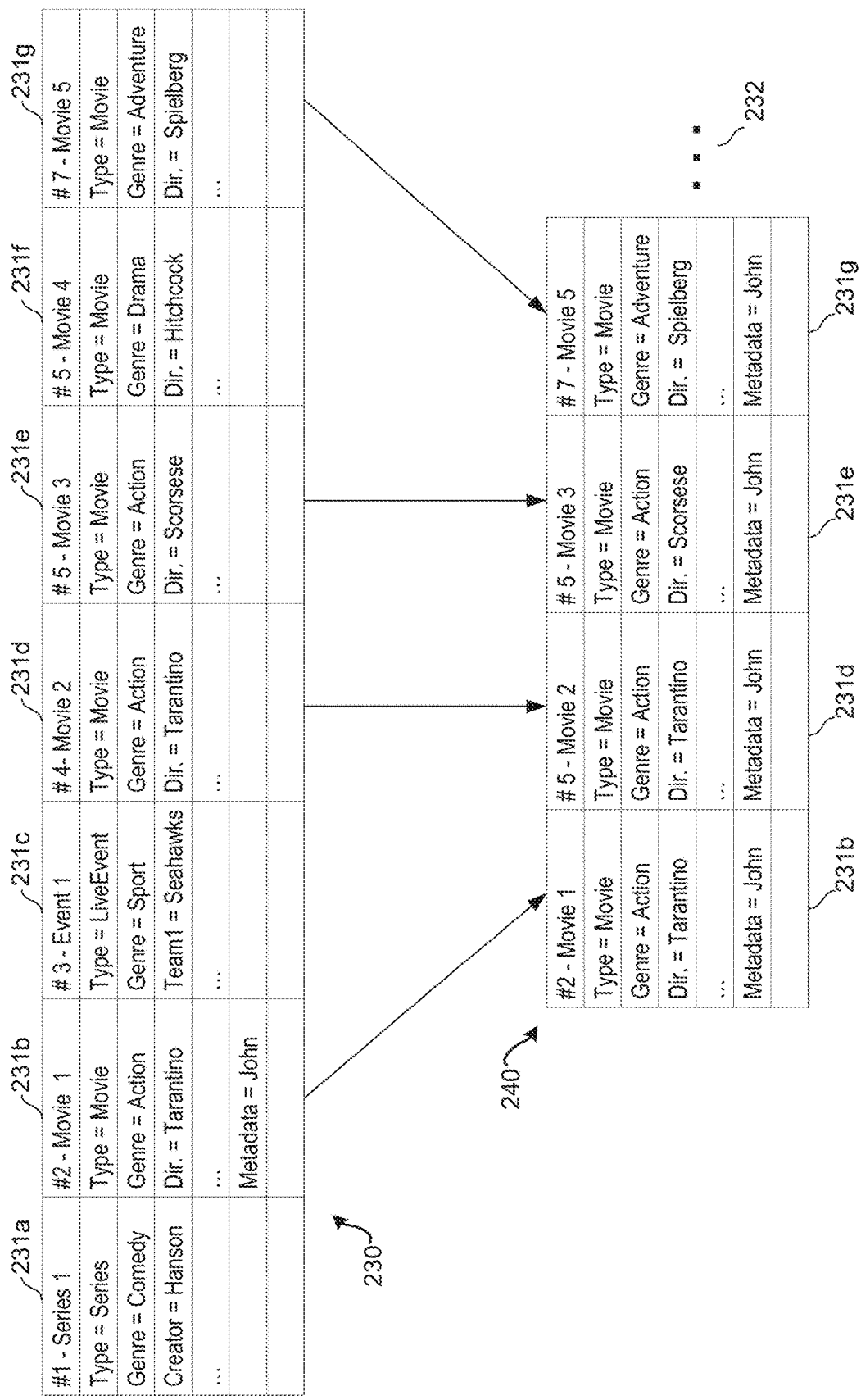

FIG. 2E illustrates example program data 230 that is processed by the mosaic manager 138 via the example mosaic filter. The program data 230 is a collection of records 231a-231g, each of which stores information about a particular program. The program data 230 may be stored as part of the EPG information 134 discussed with respect to FIG. 1. It may be obtained in various ways, such as via the broadcast network (e.g., embedded in a transmission stream), over the Internet (e.g., from a Website), from local storage (e.g., from a local database of movie information), or the like. Each of the records 231a-231g represents attributes corresponding to a particular program. In this example, the attributes are stored as name-value pairs.

Continuing the example of FIG. 2D, the generated mosaic filter corresponds to program record 231b. In this embodiment, the program record 231b is annotated with metadata or a tag that reflects its association with (or usage as) a mosaic filter. In this case, record 231b is tagged with the string "John," as input via the text input field 221.

Next, the record 231b is compared to the other records 231a and 231c-231g to identify records that have attributes that are at least similar to the attributes of record 231b. In this case, the selection process identifies three other records, 231d, 231e, and 231g. Record 231d is selected because it is also an action movie directed by Tarantino. Record 231e is selected because it is also an action movie, although it is directed by Scorsese and not Tarantino. Finally, record 231g is selected because it is an adventure movie, and adventure is considered a sub-genre (or related genre) of the action genre. In this example, record 231d is the most similar to record 231b, while 231g is the least similar, although still sufficiently related to warrant selection.

The selected records are depicted as part of data collection 240. Note that the collection 240 may include additional records, not shown, as indicated by the ellipsis 232. Note also that in this embodiment, the tag "John" is added to each of the selected records 231d, 231e, and 231g. By adding the tag to these records, the media mosaic 106 and associated logic need not perform name-value field comparisons to determine whether or not these records match the "John" filter in the future. Rather, the media mosaic 106 simply searches for records that are tagged "John" (and possibly new records that have been added since the "John tag was created) and uses those records as part of a filtered mosaic.

This tagging procedure thereby eliminates the need to reprocess the entire program data 230 when the filter is applied in the future. This technique improves the functioning of a computer system, for example the media device 102 and the mosaic manager 138, by reducing the amount of processing necessary to present media mosaics.

Figure 2F:
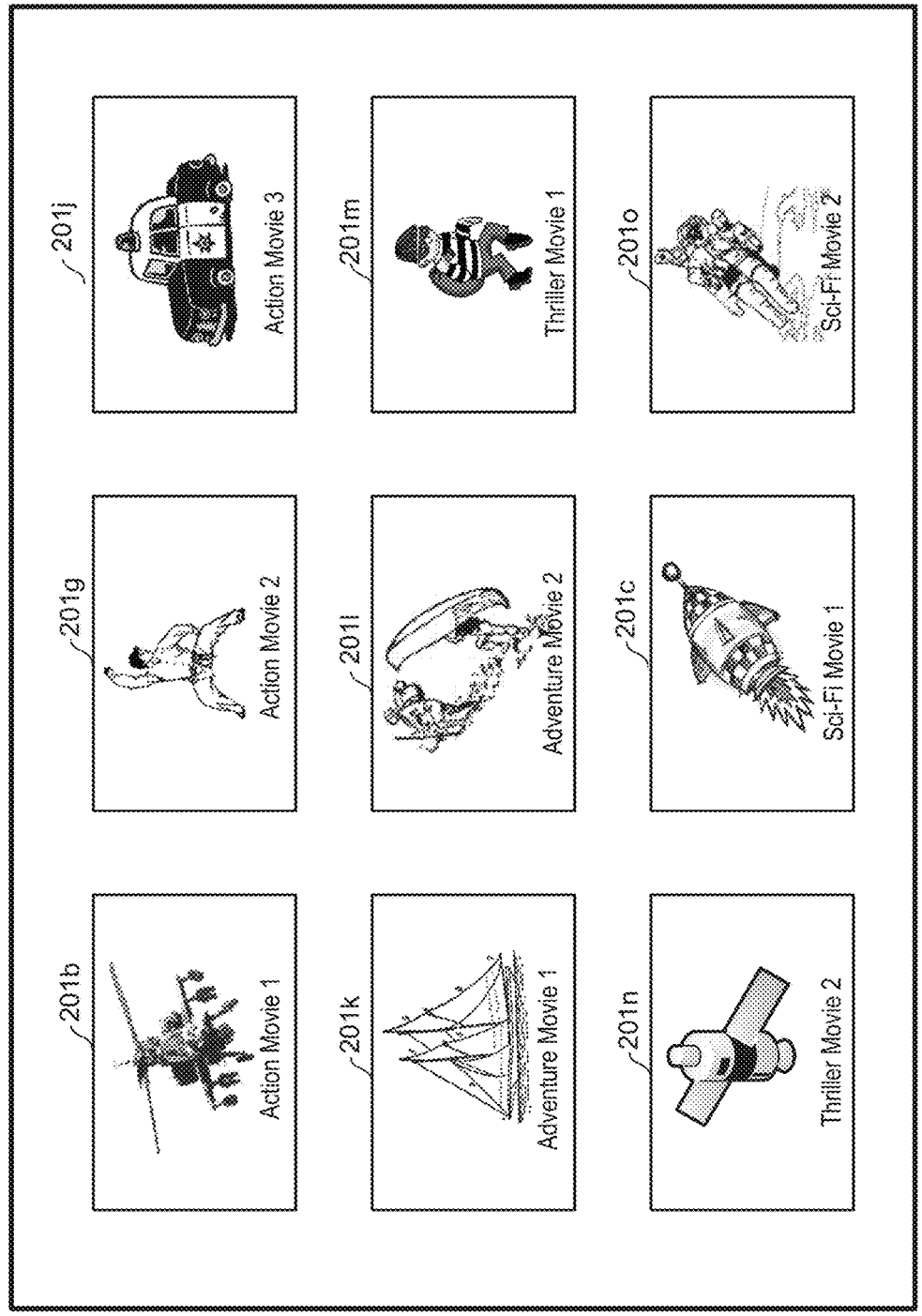

FIG. 2F illustrates the media mosaic 106 after application of the example mosaic filter. The media mosaic 106 now includes a set of tiles that present information about programs that were selected as discussed above. Note that some of the tiles are the same as those presented in the mosaic 106 of FIG. 2A. In particular, tile 201b corresponds to the action movie that was selected (FIG. 2C) as the basis for the mosaic filter. Also, tile 201g, which was shown in FIG. 2A, corresponds to a second action movie, such as the action movie of record 231d in FIG. 2E. Tiles 201j and 201k correspond to the movies of records 231e and 231g in FIG. 2E. The remaining tiles correspond to programs that have been selected because they are similar to the mosaic filter. As the filter focused on action movies by director Tarantino, the other tiles present programs (typically movies) that are similar in some way, such as because they may share the same director, have a similar genre (e.g., adventure, thrillers, and science fiction are related to the action genre), or have some other related characteristic or feature.

The described filtering techniques improve the functioning of a computer system by making better use of limited display space. As noted, legacy EPGs and traditional video mosaics present information based on channel and time, and thus frequently present information that is of little interest to the user. The described filtering techniques address this problem by presenting information that is tailored to the user's interests, thereby making better use of the limited display area provided by typical display screens.

FIGS. 3A-3H are tables that illustrate an example filter scoring process provided by an example embodiment. Some embodiments generate a score for multiple programs, where the score for each program is based on a comparison between a mosaic filter and the program. An example scoring process is described below.

FIG. 3A depicts a program record table 300 that represents attributes of a single program named "Jurassic Park." The table 300 represents attributes via a collection of name-value pairs, where the names include Type, Title, Key words, Genre, Director, Writer, TV host, Actor, Year of premiere, and Metadata. A greater or lesser number of attributes, or attributes of different kinds, may be represented in other embodiments or configurations. Note also that attributes may have multiple values. For example, three different actors are represented (Sam Neill, Laura Dern, and Jeff Goldblum) via the Actor 1, 2, and 3 fields. Also, some attributes may not have assigned values, such as the TV host attribute. The Metadata field is here used to associate a tag or filter name (e.g., "John") with this program record. In other embodiments, such a tag may be stored in a separate data structure, such as a table that associates filter names with programs. The illustrated data may be obtained from various sources, including from EPG information 134, from the broadcast network, from Internet sources (e.g., Web sites), local media (e.g., local storage, removable storage), or the like.

FIGS. 3B and 3C show example points tables 310 and 320 that are used by an example scoring process. Some embodiments use a scoring process to determine a similarity score, which is a level of similarity, relatedness, or affinity between a filter and multiple program records. By way of overview, the process compares attributes of the filter (e.g., represented by way of table 300) with corresponding attributes from another program record. Different point values may be assigned for exact matches, partial matches, or the like. The point values may be specified by a points table such as the points tables 310 and 320.

In FIG. 3B, points table 310 specifies the number of points to assign based on a comparison of the Type attribute of given program records. In the table 310, the field values for a first program record (e.g., the mosaic filter) are represented in rows, while the field values for a second program record (e.g., a record being compared to the mosaic filter) are represented in columns. Exact matches appear along the diagonal and are each worth 20 points. Partial matches (e.g., similar fields) are shown elsewhere in the table. For example, if a first and second program record have a Type of Movie, then 20 points would be assigned to the similarity score. If instead the first and second program record have Types of Movie and Documentary, respectively, then 10 points would be assigned to the similarity score.

In FIG. 3C, points table 320 specifies the number of points to assign to the similarity score based on a comparison of the Genre attribute of given program records. Points tables provide for the representation of different levels of similarity or relatedness. For example, in table 320, Action and Adventure are represented as related (but not identical) genres, as is reflected by the 10 point similarity score. Action and Crime are also considered related, but not as closely as Action and Adventure, as reflected by the 5 point similarity score.

FIG. 3D shows two program records 330 and 335. The program record 330 represents the movie "Jurassic Park," while program record 335 represents the movie "Independence Day." As noted above, some attributes may be multi-valued. In this example, the program records 330 and 335 have multiple values for Genre, as represented by the fields Genre 1 and 2 present in both program records. In some embodiments, an exhaustive comparison may be carried out, in which the Genre 1 value of program record 330 is compared to the Genre 1 and 2 values of program record 335, and then the Genre 1 value of program record 335 is compared to the Genre 1 and 2 values of program record 330. In general, such an exhaustive comparison results in N×M comparisons, where N is the number of values for an attribute in a first record and M is the number of values for the same attribute in a second record.

FIG. 3E depicts an example of similarity scoring with multi-valued attributes. Here, table 340 depicts the four comparisons made when comparing the multiple values for the Genre attributes of records 330 and 335. Using the points specified in points table 320, Adventure (Genre 1, Jurassic Park) compared with Action (Genre 1, Independence Day) results in 10 points. Adventure (Genre 1, Jurassic Park) compared with Adventure (Genre 2, Independence Day) results in 20 points. Science Fiction (Genre 2, Jurassic Park) compared with Action (Genre 1, Independence Day) results in 5 points. Science Fiction (Genre 2, Jurassic Park) compared with Adventure (Genre 2, Independence Day) results in 10 points. The four comparisons result in a total score of 45 points.

Note that other approaches to scoring multi-valued attributes are contemplated. For example, for a given attribute, the resulting score may be divided by the number of comparisons (or some other factor) so as to not unfairly weight multi-valued factors with a large number of factors. In the above example, this would mean dividing the score of 45 points by 4 (the number of comparisons), yielding a scaled score of 11.25 points.

FIG. 3F shows an example points table 350 that is used by the example scoring process for scoring the Director attribute. Note that the points table 350 also represents relative similarities between directors by specifying different scores for pairs of directors based on their degree of similarity. Other attributes, such as Writer, TV Host, Actor, and the like can be scored in a similar manner. Furthermore, attributes that are typically multi-valued, such as Actor, can be scored as described with respect to the Genre attribute, above.

FIG. 3G shows an example points table 360 that is used by the example scoring process for scoring a time-based attribute, such as premiere year, decade, or other time period. In this embodiment, a five-year time period is used as the relevant time period for comparing program ages. As can be seen, programs that premiered during the same five-year period are awarded 20 points, programs that premiered during adjacent five-year periods are awarded 10 points, and so on.

In other embodiments, the time-based score may be determined differently. For example, the score may be expressed as max(0, C−|year1−year2|), where C is some constant (e.g., 20) and year1 and year2 are two premiere years. Thus, two programs having premieres in 1998 and 2005 would receive a score of 13. As another example, two programs having premieres in 1975 and 2005 would receive a score of 0, because their premieres separated by more than 20 years.

Other types of attributes may be scored using techniques discussed above or other approaches. In general, attributes that have a small number of possible values are amenable to the approaches described with respect to Genre, above. For text-based values, such as Title, one approach is to determine whether any of the words in the title of a one program also exist in the title of other programs. For example, if the first program is titled "Jurassic Park," the title may be decomposed into two separate keywords (Jurassic and Park), which are then used as search terms against other titles. Each match may be awarded a fixed number (e.g., 5) of points. Thus, a second program titled "Jurassic Park 2" would score 5+5 extra points, because this title contains both keywords. A third program titled "Jurassic City" would be assigned 5 extra points because only the word "Jurassic" exists in both titles.

Some programs may also include a KeyWords attribute, which includes one or more keywords or tags or other text that describes or characterizes the program. For example, a key word for "Jurassic Park" could be "dinosaur." In this case, any other program having the keyword "dinosaur" would score extra points for the match.

Some embodiments may have a set of rules for scoring different attributes. For example, a default rule may assign a specified number of points for an exact attribute match, and zero otherwise. This rule is used for an attribute unless a different rule is specified for the attribute. Some attributes may be associated with scoring/points tables, such as those describe above. When a points table is provided, the points table is used in lieu of the default rule.

FIG. 3H shows a score summary table 370 for multiple programs. In the first row, the program that was originally used to create the filter (Jurassic Park) is given an arbitrarily high score, or whatever score results from comparing it to itself (which typically would be expected to be higher than any other comparison). The subsequent rows each store a score that reflects the similarity between the filter (as represented by the first program in the table) and the program listed in the current row. As noted above, the filter tag (e.g., "John") may be applied to each of the programs in table 370, in order to speed up recall and processing for future requests to browse the filtered mosaic.

The number of rows may reflect the maximum mosaic size. The table 370 only includes the top-scoring programs, such that the resulting mosaic represents the most similar programs. The maximum mosaic size may be user-adjusted in some embodiments.

In some embodiments, the user can apply multiple filters. In one embodiment, applying multiple filters results in the independent application of each filter, and then a set-wise comparison (e.g., intersection) of the resulting programs, so that only programs that appear in each filtered mosaic are placed into the combined mosaic. In another embodiment, applying multiple filters results in the aggregation of scores for each program, followed by a generation of a single top-score table. For example, if Filters 1, 2, and 3 are applied to programs p1 . . . $p_N$, a score for each program $p_i$ is determined by summing the scores for Filters 1-3 applied to program $p_i$.

Optionally, programs could be filtered based on ratings. For example, programs with a rating less than a specific grade could be filtered out. Grades may be determined by reference to Internet sites (e.g., IMDB.com, Rotten Tomatoes), ratings agencies (MPAA), or the like.

Figure 4:
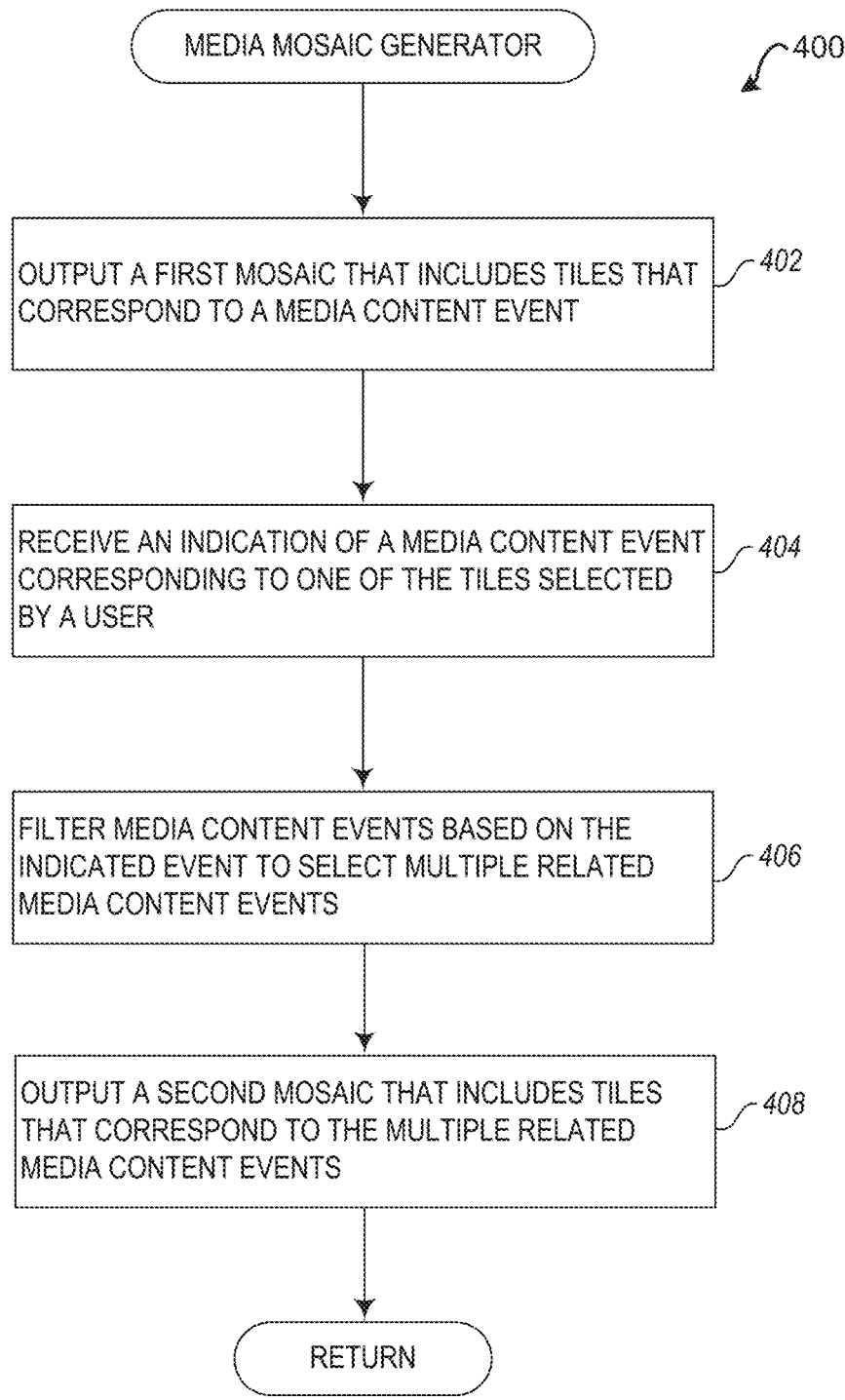
FIG. 4 is a flow diagram illustrating an example process for generating a media mosaic according to an example embodiment.

FIG. 4 is a flow diagram illustrating an example process 400 for generating a media mosaic according to an example embodiment. The process 400 may be performed by the media mosaic manager 138 or some other logic component of the media device 102 or other computing system.

At block 402, the process outputs a first mosaic that includes tiles that correspond to a media content event. An example of a first mosaic is given with respect to FIG. 2A, above. Outputting a mosaic may include transmitting data representing the mosaic to some other device (e.g., a display device, a remote set-top box, a mobile device) for display by or on that device. In other cases, outputting the mosaic may include actually displaying the mosaic on a coupled display device.

At block 404, the process receives an indication of a media content event corresponding to one of the tiles selected by a user. An example of receiving such an indication is given with respect to FIG. 2C, above.

At block 406, the process filters media content events based on the indicated media content event to select multiple related media content events. Selecting related media content events may include determining multiple related media content events that are similar to the indicated event. An example of determining related media content events is discussed with respect to FIGS. 3A-3H, above.

Determining related content events may include determining attributes of the indicated media content event; and selecting the multiple related media content events by comparing the determined attributes (e.g., Genre, Type, Director, Actor) to corresponding attributes of multiple other media content events, wherein the selected media content events each have at least one attribute in common with the indicated media content event.

Selecting the multiple related content events may include determining multiple scores that each reflect how many attributes of a corresponding media content event are in common (e.g., identical or related to) with the determined attributes of the indicated media content event; and selecting the multiple related media content events, such that the selected media content events each have corresponding scores that are higher than the scores corresponding to media content events that are not selected. As noted above, a number of scores may be generated, and then the programs having the N highest scores can be selected.

As noted above, attributes may be represented by way of name-value pairs. In this case, determining the multiple scores may include accessing a score data structure (e.g., points table 320) that associates, for each of multiple attribute name-value pairs, a corresponding value to add to a similarity score when two media content events both have attributes matching the attribute name-value pair. As also noted above, different scores may be assigned depending on whether two attributes are identical or similar/related.

At block 408, the process outputs a second mosaic that includes tiles that correspond to the multiple related media content events. An example of a second mosaic is given with respect to FIG. 2F, above. After block 408, the process returns or goes on to perform other functions.

Other embodiments may provide additional or other functions. For example, the process may determine whether to output recorded or live video in each mosaic tile. In some cases, the process 400 (or another media mosaic manager process) includes, for each of multiple tiles of a mosaic, determining whether to output live or delayed video from the corresponding media content event; and when it is determined to output live video, displaying live video on the tile, otherwise displaying delayed video on the tile.

Determining whether to output live or delayed video includes determining whether displaying live video would spoil the ending of the media content event. This determination may be based on event type (e.g., movies or sporting events are likely to be spoiled by showing live video).

Also, the process may determine to show live/recorded video based on whether a tuner is available to obtain live video. Media devices typically have a limited number of tuners, so that the media mosaic manager 138 may not be able to output live video for each tile. In some cases, the process proactively records video from the beginning of media content events based a determination that outputting live video from the media content events would spoil the ending of the media content events. For example, knowing that a given mosaic includes a sports program, the media mosaic manager may record the first few minutes of the sporting event in order to have a clip to display in the mosaic.

Figure 5:
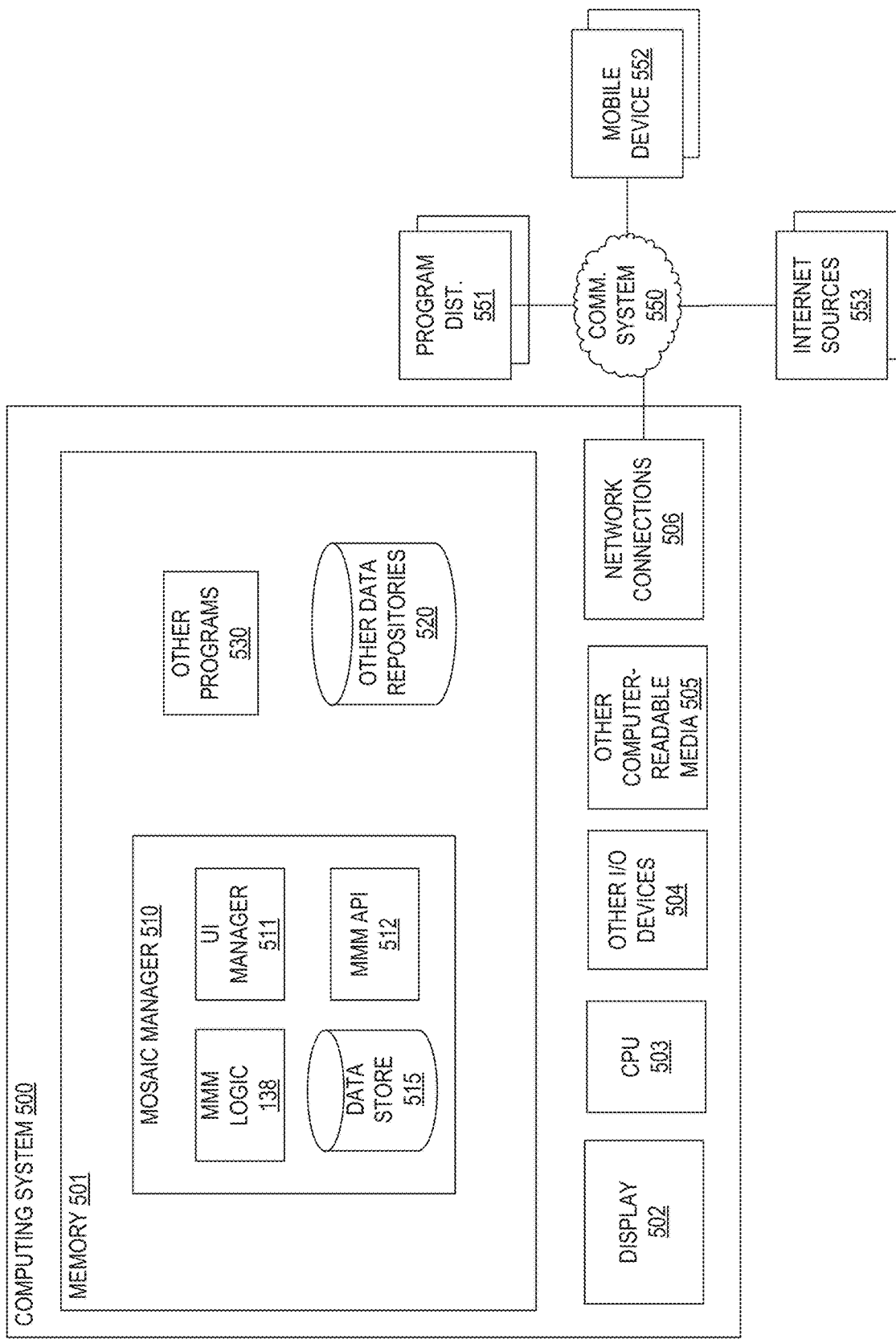
FIG. 5 is a block diagram of an example computing device/system configured to implement an example embodiment.

FIG. 5 is a block diagram of an example computing device/system configured to implement an example embodiment. FIG. 5 shows a computing system 500 that may be utilized to implement a media mosaic manager 138. In one embodiment, the computing system 500 is part of a set-top box or other media device 102 as described with respect to FIG. 1. In other embodiments, the computing system 500 is part of a presentation device, such as a television. In still other embodiments, the computing system 500 is part of a mobile computing device, such as a smart phone or tablet computer.

In the embodiment shown, the computing system 500 comprises a computer memory ("memory") 501, a display 502, one or more Central Processing Units ("CPU") 503, Input/Output ("I/O") devices 504 (e.g., audio processor, video processor, keyboard, mouse, CRT or LCD display cards or drivers, and the like), other computer-readable media 505, and network connections 506. The media mosaic manager 138 is shown residing in memory 501. In other embodiments, some portion of the contents, some of, or all of the components of the media mosaic manager 138 may be stored on and/or transmitted over the other computer-readable media 505. The components of the media mosaic manager 138 preferably execute on one or more CPUs 503 and manage the generation of media mosaics, as described herein. Other code or programs 530 (e.g., an audio/video processing module, an electronic program guide manager module, a Web browser or server, and the like) and potentially other data repositories, such as data repository 520, also reside in the memory 501, and preferably execute on one or more CPUs 503. Of note, one or more of the components in FIG. 5 may not be present in any specific implementation. For example, some embodiments may not provide other computer-readable media 505 or a display 502.

The illustrated media mosaic manager 510 includes media mosaic management logic 138, a user interface ("UI") manager 511, a media mosaic manager application program interface ("MMM API" or simply "API") 512, and a data store 515. The logic 138 includes instructions that are configured to, when executed by the CPU 503, perform the functions of the mosaic manager 510, such as creating new filters, applying filters, identifying similar programs, performing similarity scoring processes, and the like.

The UI manager 511 provides a view and a controller that facilitate user interaction with the media mosaic manager 138 and its various components. For example, the user interface manager 511 provides interactive graphical user interface elements such as those discussed with respect to FIGS. 2A-2E, above. As discussed, such user interfaces are operable by users to interact with the media manager to create and apply mosaic filters.

The API 512 provides programmatic access to one or more functions of the media mosaic manager 138. For example, the API 512 may provide a programmatic interface to one or more functions of the media mosaic manager 138 that may be invoked by one of the other programs 530 or some other module. In this manner, the API 512 facilitates the development of third-party software, such as user interfaces, plug-ins, news feeds, adapters (e.g., for integrating functions of the media mosaic manager 138 into Web applications), and the like.

In addition, the API 512 may be in at least some embodiments invoked or otherwise accessed via remote entities, such as code executing on a remote client device, to access various functions of the media mosaic manager 138. For example, a remote device, such as mobile device 552, may interact with the API 512 in order to obtain a mosaic for presentation on the mobile device 552, or to provide a specification of a new mosaic for processing by the manager 510. The API 512 may also be configured to provide code modules that can be integrated into third-party applications and that are configured to interact with the action media mosaic manager 138 to make at least some of the described functionality available within the context of other applications.

The data store 515 may be used to store various types of information used by the media mosaic manager 138. For example, the data store 515 may store user preferences, user history, mosaic information, EPG information, and the like.

The computing system 500 communicates with various remote entities via a communication system 550. The communication system may include or stand for one or more distinct communication networks, media, channels, or the like. For example, the computing system 500 may communicate with a program distributor 551 via a broadcast network implemented via cable, satellite broadcast, or the like. In addition, the computing system 500 may communicate via the Internet (implemented over an assortment of physical media) with Internet sources 553 (e.g., program information databases, review Websites, etc.). Further, the computing system 500 may communicate with a mobile device 552 (e.g., a user's smartphone or tablet) via a local network, such as to provide a hybrid interface in which the mosaic is presented on the mobile device in order to take advantage of the improved interactivity (e.g., touch capabilities) of the mobile device.

In an example embodiment, components/modules of the media mosaic manager 138 are implemented using standard programming techniques. For example, the media mosaic manager 138 may be implemented as a "native" executable running on the CPU 503, along with one or more static or dynamic libraries. In other embodiments, the media mosaic manager 138 may be implemented as instructions processed by a virtual machine that executes as one of the other programs 530. In general, a range of programming languages known in the art may be employed for implementing such example embodiments. By implementing and executing the media mosaic manager 138, the computing system 500 becomes a special purpose machine that is specially configured to manage media mosaics as described herein.

In addition, the embodiments described above may also be structured in various ways, including but not limited to, multiprogramming, multithreading, client-server, or peer-to-peer, running on one or more computer systems each having one or more CPUs. Some embodiments may execute concurrently and asynchronously, and communicate using message passing, pipes, signals, or other communication techniques. Also, other functions could be implemented and/or performed by each component/module, and in different orders, and by different components/modules, yet still achieve the described techniques.

Furthermore, in some embodiments, some or all of the components of the media mosaic manager 138 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be non-transitorily stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It should be emphasized that the above-described embodiments are merely possible examples of implementations of the invention. Many variations and modifications may be made to the above-described embodiments. All such modifications and variations are intended to be included herein within the scope of this disclosure and protected by the following claims.

What is claimed is:

1. A method in a media device communicatively coupled to a display, comprising:
   by the media device, outputting, for presentation on the display, a first mosaic that includes a first set of tiles that each correspond to a first distinct media content event, wherein each of the first set of tiles displays video from a corresponding media content event;
   receiving an indication of a media content event corresponding to one of the first set of tiles;
   filtering media content events based on the indicated media content event, by comparing attributes of the indicated media content event with attributes of the media content events;
   determining a similarity score of the media content events based on the comparison of the attributes of the indicated media content event with attributes of the media content events; and
   selecting, from the media content events, multiple related media content events based on the similarity score;
   tagging the selected multiple related media content events with a string based on the determined similarity score; and
   outputting, for presentation on the display, a second media mosaic that includes a second set of tiles that each correspond to a second distinct media content event tagged with the string,
   wherein each of the media content events is being currently transmitted via a broadcast network coupled to the media device, and
   further comprising for each of the second set of tiles:
      determining whether to output live or delayed video from the corresponding media content event; and
      when it is determined to output live video, displaying live video on a tile of the second set of tiles, otherwise displaying delayed video on the tile of the second set of tiles.

2. The method of claim 1, wherein the determining to output live or delayed video from the corresponding media content event further comprises:
   determining that the output of live video displays ending results of an event.

3. The method of claim 1, further comprising:
   determining the indicated media content event corresponds to the tagged multiple media content events.

4. The method of claim 1, further comprising:
   receiving a personal preference specified by the user.

5. The method of claim 4, further comprising:
   adjusting the second set of tiles to indicate an order of the personal preference specified by the user for the corresponding media content events.

6. The method of claim 1, further comprising:
   outputting the second media mosaic that includes the second set of tiles that each correspond to media content events based on viewing habits of the user for a timeslot.

7. The method of claim 1, wherein the attributes of the media content events are selected from the group consisting of a type, title, key word, genre, director, writer, television host, year of premiere, or metadata.

8. The method of claim 1, further comprising:
adjusting the similarity score of the selected multiple related media content events based on being tagged.

9. A system comprising:
a server including at least one processor and a memory, the memory storing instructions executable by the at least one processor such that the at least one processor is programmed to:
output, for presentation on a display, a first mosaic that includes a first set of tiles that each correspond to a first distinct media content event, wherein each of the first set of tiles displays video from a corresponding media content event;
receive an indication of a media content event corresponding to one of the first set of tiles;
filter media content events based on the indicated media content event, by comparing attributes of the indicated media content event with attributes of the media content events;
determine a similarity score of the media content events based on the comparison of the attributes of the indicated media content event with attributes of the media content events; and
select, from the media content events, multiple related media content events based on the similarity score;
tag the selected multiple related media content events with a string based on the determined similarity score; and
output, for presentation on the display, a second media mosaic that includes a second set of tiles that each correspond to a second distinct media content event tagged with the string,
wherein each of the media content events is being currently transmitted via a broadcast network coupled to a media device, and
the processor is further programmed to for each of the second set of tiles:
determine whether to output live or delayed video from the corresponding media content event; and
when it is determined to output live video, displaying live video on a tile of the second set of tiles, otherwise displaying delayed video on the tile of the second set of tiles.

10. The system of claim 9, wherein the determining to output live or delayed video from the corresponding media content event further comprises:
determining that the output of live video displays ending results of an event.

11. The system of claim 9, further comprising:
determining the indicated media content event corresponds to the tagged multiple media content events.

12. The system of claim 9, further comprising:
receiving a personal preference specified by the user.

13. The system of claim 12, further comprising:
adjusting the second set of tiles to indicate an order of the personal preference specified by the user for the corresponding media content events.

14. The system of claim 9, further comprising:
outputting the second media mosaic that includes the second set of tiles that each correspond to media content events based on viewing habits of the user for a timeslot.

15. The system of claim 9, wherein the attributes of the media content events are selected from the group consisting of a type, title, key word, genre, director, writer, television host, year of premiere, or metadata.

16. An apparatus for displaying media content communicatively coupled to a display, comprising:
a memory;
one or more processors electronically coupled to the memory and configured for:
outputting, for presentation on the display, a first mosaic that includes a first set of tiles that each correspond to a first distinct media content event, wherein each of the first set tiles displays video from a corresponding media content event;
receiving an indication of a media content event corresponding to one of the first set of tiles;
filtering media content events based on the indicated media content event, by comparing attributes of the indicated media content event with attributes of the media content events;
determining a similarity score of the media content events based on the comparison of the attributes of the indicated media content event with attributes of the media content events; and
selecting, from the media content events, multiple related media content events based on the similarity score;
tagging the selected multiple related media content events with a string based on the determined similarity score; and
outputting, for presentation on the display, a second media mosaic that includes a second set of tiles that each correspond to a second distinct media content event tagged with the string,
wherein each of the media content events is being currently transmitted via a broadcast network coupled to a media device, and
further comprising for each of the second set of tiles:
determining whether to output live or delayed video from the corresponding media content event; and
when it is determined to output live video, displaying live video on a tile of the second set of tiles, otherwise displaying delayed video on the tile of the second set of tiles.

17. The apparatus of claim 16, wherein the determining to output live or delayed video from the corresponding media content event further comprises:
determining that the output of live video displays ending results of an event.

18. The apparatus of claim 16, wherein the one or more processors are further configured for:
determining the indicated media content event corresponds to the tagged multiple media content events.

* * * * *